United States Patent [19]
Monson

[11] 3,794,192
[45] Feb. 26, 1974

[54] PICKUP TRUCK HOIST SUPPORT

[75] Inventor: Charles D. Monson, Coon Rapids, Minn.

[73] Assignee: Inventors Engineering, Inc., Minneapolis, Minn.

[22] Filed: June 17, 1970

[21] Appl. No.: 46,899

[52] U.S. Cl........... 214/75 H, 214/86 A, 214/146.5, 212/8 R

[51] Int. Cl.............................................. B60p 1/54

[58] Field of Search... 214/75 H, 77 R, 86 A, 146.5; 212/8 R

[56] References Cited
UNITED STATES PATENTS

| | | | |
|---|---|---|---|
| 3,276,610 | 10/1966 | Thatcher | 214/77 R |
| 3,043,443 | 7/1962 | Hall | 212/8 R |
| 3,613,918 | 10/1971 | Kruschke | 214/75 H |
| 3,095,099 | 6/1963 | Costello | 214/75 H X |
| 2,687,809 | 8/1954 | Balogh | 212/8 R |

Primary Examiner—Albert J. Makay
Attorney, Agent, or Firm—Dugger, Johnson and Westman

[57] ABSTRACT

A folding support frame for boxes of pickup trucks which can be used for supporting a chain hoist or the like, and which will fold into a compact storage position on the top of the pickup box without having any members interfering with the box capacity.

The support pivots to its operative position and has automatically raisable support linkages. The support frame can be moved longitudinally in direction along the box to place items held by a hoist into the pickup truck box.

7 Claims, 5 Drawing Figures

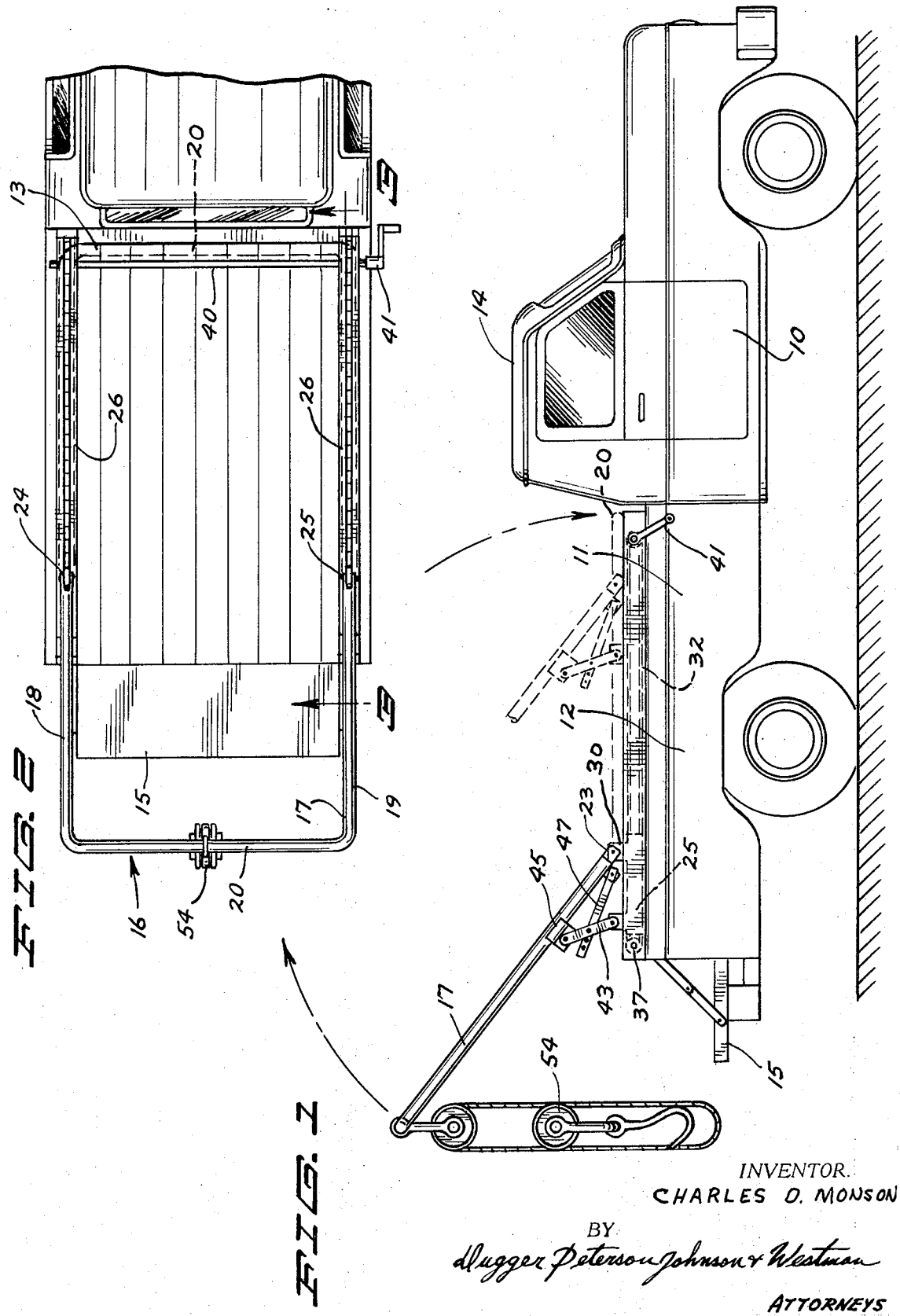

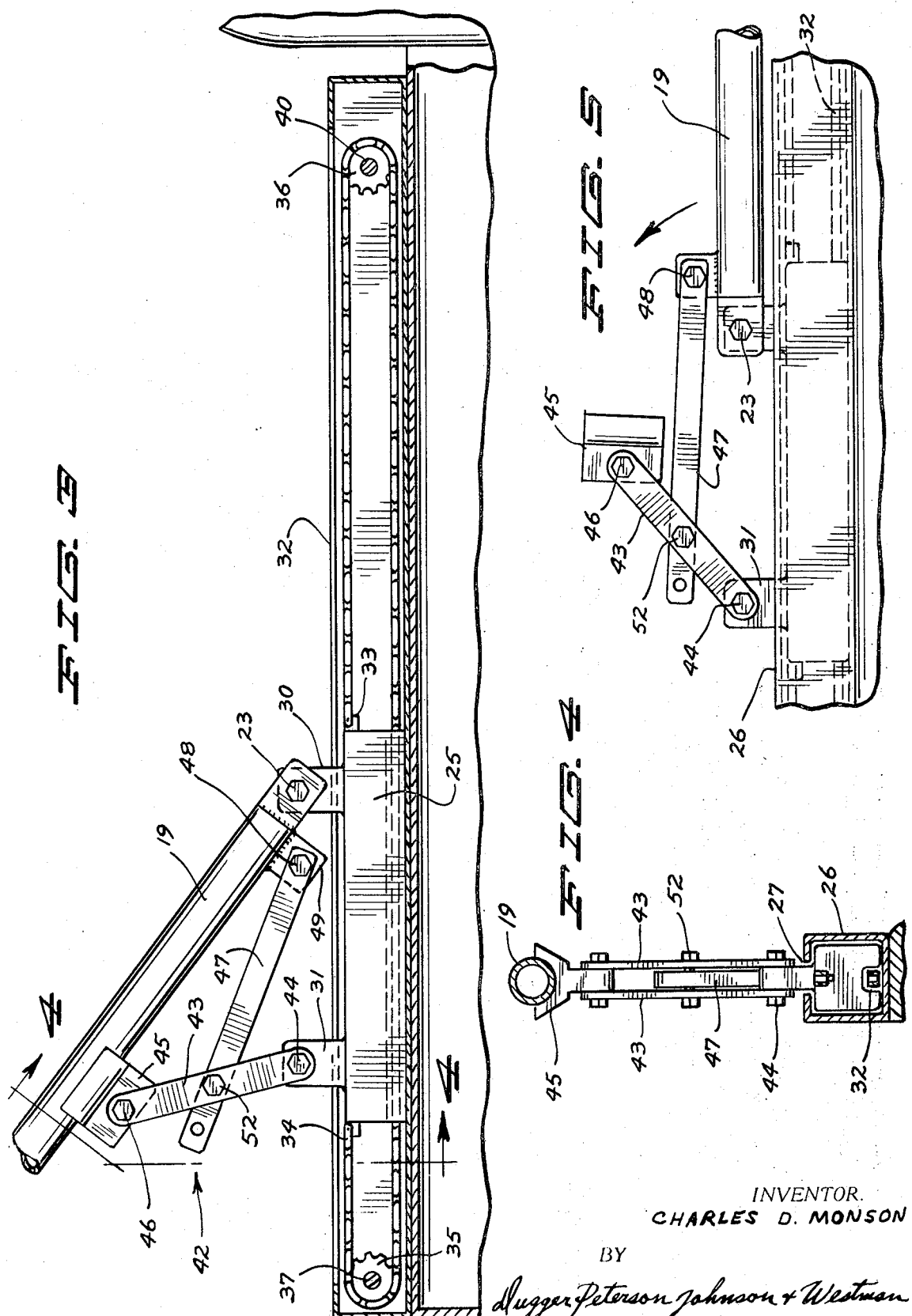

PICKUP TRUCK HOIST SUPPORT

BACKGROUND OF THE INVENTION

1. Field of the Invention

The present invention has relation to folding support members which can be mounted onto the sides of a pickup truck box.

2. Prior Art

Various support members for use with trucks have been advanced. For example, U.S. Pat. No. 3,276,610 shows a folding hoist support. The hoist support in this patent will fold flat along the top rails of a pickup truck box, but it does not have automatically erecting support links as shown in the present device. U.S. Pat. Nos. 3,095,099 and 2,911,118 show devices for supporting a hoist to move along a truck bed on carriages.

Likewise, the movable feature is shown in U.S. Pat. No. 3,341,038.

The need however still exists for a low cost easily installed and automatically supported frame for a truck box that can be quickly erected into a hoist supporting position so that the hoist is external of the truck box, and which can be moved either manually or under power to a position wherein an object supported by the hoist will be overlying the box of the truck. The object can then be lowered into the truck box for transport.

SUMMARY OF THE INVENTION

The present invention relates to an overhead support member that can be used for holding a hoist or similar lifting device and can be mounted onto a truck, as shown a pickup truck. The support frame is foldable so that it may be in a flat position, or it can be raised to its operative position and held in place by automatically operating support linkages.

Further, the entire unit is mounted onto traveling slider members so that the support frame can be moved longitudinally along guide tracks mounted on the pickup box. This permits the lifting of loads outside the rear end of the pickup box, and sliding the entire load and support member into overlying relationship to the pickup box so that the load can be dropped into the box.

The traveling sliders also mount the frame support linkages, and are continuously operable either manually or with suitable power means if desired.

The device is simple to manufacture, easy to install, and folds completely out of the way when not being used. When it is to be erected the main support is automatically held in its proper position by adjustable support linkages.

BRIEF DESCRIPTION OF THE DRAWINGS

FIG. 1 is a side elevational view of a pickup truck having a support member made according to the present invention installed thereon;

FIG. 2 is a top plan view of the device of FIG. 1;

FIG. 3 is an enlarged sectional view taken as on line 3—3 in FIG. 2;

FIG. 4 is a sectional view taken as on line 4—4 in FIG. 3, and

FIG. 5 is a side elevational view of the support shown in folded condition.

DESCRIPTION OF THE PREFERRED EMBODIMENT

A pickup truck illustrated generally at 10 is of conventional design having a box member 11. The box member has side walls 12,12 which are spaced apart, and a forward wall 13 immediately behind the cab 14 of the truck. The box has a bottom wall and includes a tailgate member 15 at the rear portion that may be raised or lowered in a conventional fashion.

In order to assist in loading the pickup box, particularly where heavy objects need to be lifted with chain hoists, a support frame assembly illustrated generally at 16 is provided. The support frame assembly includes a main U-shaped frame 17 having first and second legs 18 and 19, joined to and supporting a crossbar 20. The legs 18 and 19 are pivotally mounted as at 23 onto slider carriage members 24 and 25, respectively, that are mounted onto the opposite side walls 13 of the pickup box. The carriage members 24 and 25 are mounted in track members 26. The tracks 26, as shown in FIG. 4 are box shaped in cross section and have a slot 27 at the top thereof running along the longitudinal length thereof, except at the extreme portions where this slot is closed. This can be seen in FIG. 3.

The carriage members 24 and 25, as shown, are made to slidably fit within the track members 26, and each includes a first upright ear 30 that has the pivotal mounting for the legs 18 and 19, respectively, and a second ear 31 located toward the rear, which is used for mounting a support linkage for the U-shaped frame.

The carriages 24 and 25 further are each controlled for movement along the track members 26 through the use of endless chain members 32, which are identical on opposite sides of the pickup box. The chain members 32 as shown in FIG. 3 are attached to its respective carriage at 33 at the forward ends thereof, and at 34 at the rear ends. The chain members 32 in turn are mounted over sprockets 35 and 36 respectively that are at opposite ends of the tracks 26. The sprockets 35 are mounted onto separate stub shafts 37 at the outer end of each of the tracks. The shafts 37 are each rotatably mounted in the side walls of its responsive track 26. sprockets 36 on each side of the truck are mounted onto a common shaft 40 which extends across the forward end of the pickup truck box adjacent to and above the front wall 13.

As shown, the shaft 40 can be driven manually with a crank 41, or if desired an electric motor or hydraulic motor can be used for driving the shaft 40. When the shaft 40 is rotated, the carriage members 24 and 25 will be moved in the proper direction along the respective tracks 26. The carriages move simultaneously. The cross shaft 40 drives the sprockets 36 on both of the tracks and in turn drives the chain 32 from both of the tracks to move the respective carriages. This means that the frame member 17 can be moved in and out along the side walls of the truck box by driving or cranking the shaft 40. The drive is positive in both directions through the use of the chains 32 mounted over their provided sprockets and attached to the respective carriages.

The position of the frame 17, and its legs 18 and 19 with respect to the ground is controlled through the use of support linkages 42 one on each side of the pickup. Each support linkage includes a main link 43 that is pivotally mounted as at 44 to the second ear 31 on the respective carriages (there is one main support link for each carriage). Each main link 43 is made up of two straps, and carries a separate saddle 45 that is pivotally mounted as at 46 to the outer end of the respective link 43. The saddle is of size to receive and support the respective legs 18 and 19, as shown in FIG. 4 when the frame reaches its proper angular position about its pivots 23. Separate control links 47 are attached, as at 48, to a separate ear 49 on each of the respective legs 18 and 19, and in turn the control links 47 are pivotally attached as at 52 to the midpoint or center portion of their respective main link 43.

As shown, the length of the control links 47 between their respective pivots 52 and 48 can be changed by having adjustment holes. There is one adjustment hole shown in FIG. 3.

The control links 47 thus will control the pivoting of the main link 43 about its pivot 44 when the frame 17 is raised or lowered.

As shown in FIG. 5, when the frame 17 is lying flat, in other words when the crossbar 20 is above the front wall 13, as shown in dotted lines in FIG. 2, the main link will be folded forwardly and will be in a rest position with the saddles 45 not supporting the leg 18 and 19. When the legs 18 and 19 are moved about pivot 23 (both legs 18 and 19 will move simultaneously) the respective control links 47 will act on the main links 43 through the pivot connections 52 and 48 to push the main links 43 rearwardly about their pivots 44, and as the legs 18 and 19 pivot rearwardly, the saddles 45 will contact the legs 18 and 19 on their respective side. The saddles 45 of course are pivotally mounted to the links 43 and will move to position wherein they rest against surfaces of the legs 18 and 19 to provide support for the legs 18 and 19. The legs 18 and 19 will be supported in position as shown at FIG. 1.

A chain hoist 54 of conventional design can be mounted onto the cross member 20 and used for lifting heavy objects. When the object is lifted above the level of the tailgate, for example, the entire support frame assembly can be moved toward the forward end of the pickup box by turning the shaft 40, which in turn will drive the chains 32 and the carriages 24 and 25 to move the frame 17 inwardly. The load held by the hoist can then be deposited into the truck box. The forward position of the support frame is shown in dotted lines in FIG. 1.

The folding of the support linkages 43,47 is automatic, and the linkages will place the frame 17 in a proper position for use every time the frame member is moved to its operative position. In its folded down position, with the cross member 20 adjacent the forward end of the box, the support linkages will fold down as well. Linkage adjustments may be made to change the angular position of the frame 17 with respect to the ground.

What is claimed is:

1. A support device for mounting onto the back of truck bodies and the like comprising a framework having spaced apart legs, spaced track means mounted on the rear portions of said truck body, separate slider members slidably mounted in each of said track means, means to pivotally mount said legs with respect to said slider members at spaced positions and support means for engaging said legs and holding said legs in a first predetermined angular position with respect to the truck body in a first direction of pivoting from a reference position comprising a folding linkage, means to mount said linkage to said slider members in relation to said pivotal mounting of said legs to position said folding linkage in proper relationship to support said legs when said legs are pivoted in said first direction, and means permitting said linkage to fold and not support said legs when said legs are pivoted in opposite direction from the first position.

2. The combination as specified in claim 1 wherein said legs pivot in said opposite direction to substantially a horizontal position.

3. The combination as specified in claim 1 wherein said slider members are slidably mounted along opposite lateral sides of said truck body.

4. The combination as specified in claim 1 and flexible link means for controlling movement of said slider members along said track means, said flexible link means on opposite slider members being drivably mounted to a common shaft at the forward portions of the truck body for movement in opposite directions along said track means.

5. The combination as specified in claim 1 wherein said folding linkage comprises a separate first link for each leg pivotally mounted to the respective slider member, and spaced from the pivot of its respective leg, and positioned toward the rear of said truck body, a separate saddle member pivotally mounted to an opposite end of each of said first links, and aligned with its respective leg, and a separate control link pivotally mounted to each of said legs, and to its respective first link in the midportions thereof whereby said control links will cause said first links to move from a substantially upright leg supporting position with the legs in their first position to a folded position when said legs are pivoted in opposite direction.

6. The combination as specified in claim 5 wherein the pivotal connections between said first links and said control links are adjustable to change the position of the pivot of at least one of said links.

7. The combination as specified in claim 6 wherein said support frame includes a cross member joining said legs at the outer end thereof, and wherein said track means are of sufficient length so that said slider members can be moved on said track means to a position wherein said cross member will clear the rear extremity of said truck body, said slider members being movable toward the front of said truck body to a position wherein said cross member overlies the truck body when said legs are supported by said linkage.

* * * * *